United States Patent [19]

Farrell

[11] 3,930,779

[45] Jan. 6, 1976

[54] INJECTION MOLDING APPARATUS WITH IMPROVED COOLING

[75] Inventor: John J. Farrell, Green Brook, N.J.

[73] Assignee: Farrell Patent Company, Greenbrook, N.J.

[22] Filed: Jan. 15, 1974

[21] Appl. No.: 433,578

[52] U.S. Cl. .................. 425/242 B; 425/326 B; 425/DIG. 208; 425/DIG. 209
[51] Int. Cl.² ............... B29D 23/02; B29D 23/03
[58] Field of Search ......... 425/DIG. 208, DIG. 209, 425/242 B, 324 B, 326 B, 387 B; 264/94, 97

[56] References Cited
UNITED STATES PATENTS

| | | | |
|---|---|---|---|
| 3,029,468 | 4/1962 | Valyi | 425/DIG. 209 |
| 3,191,225 | 6/1965 | Polka | 425/DIG. 208 X |
| 3,707,591 | 12/1972 | Chalfant | 425/242 B X |
| 3,709,644 | 1/1973 | Farrell | 425/244 X |
| 3,761,219 | 9/1973 | Flynn et al. | 425/DIG. 209 X |
| 3,789,093 | 1/1974 | Bose | 264/98 X |

Primary Examiner—Francis S. Husar
Assistant Examiner—Carl Rowold

[57] ABSTRACT

This invention cools the blowing mold and the plastic article blown therein to shorten the time that a core rod must remain at a blowing station of a blow molding machine for making plastic articles. The cooling is performed by conditioned air that is dried to lower its dew point. An air curtain is used to prevent other air from contacting with and depositing moisture on the mold. In order to take advantage of the shorter time at the blowing station, an auxiliary injection device is used to also shorten the time required for the injection operation; and auxiliary cooling is supplied to the core rod at the stripper station.

6 Claims, 10 Drawing Figures

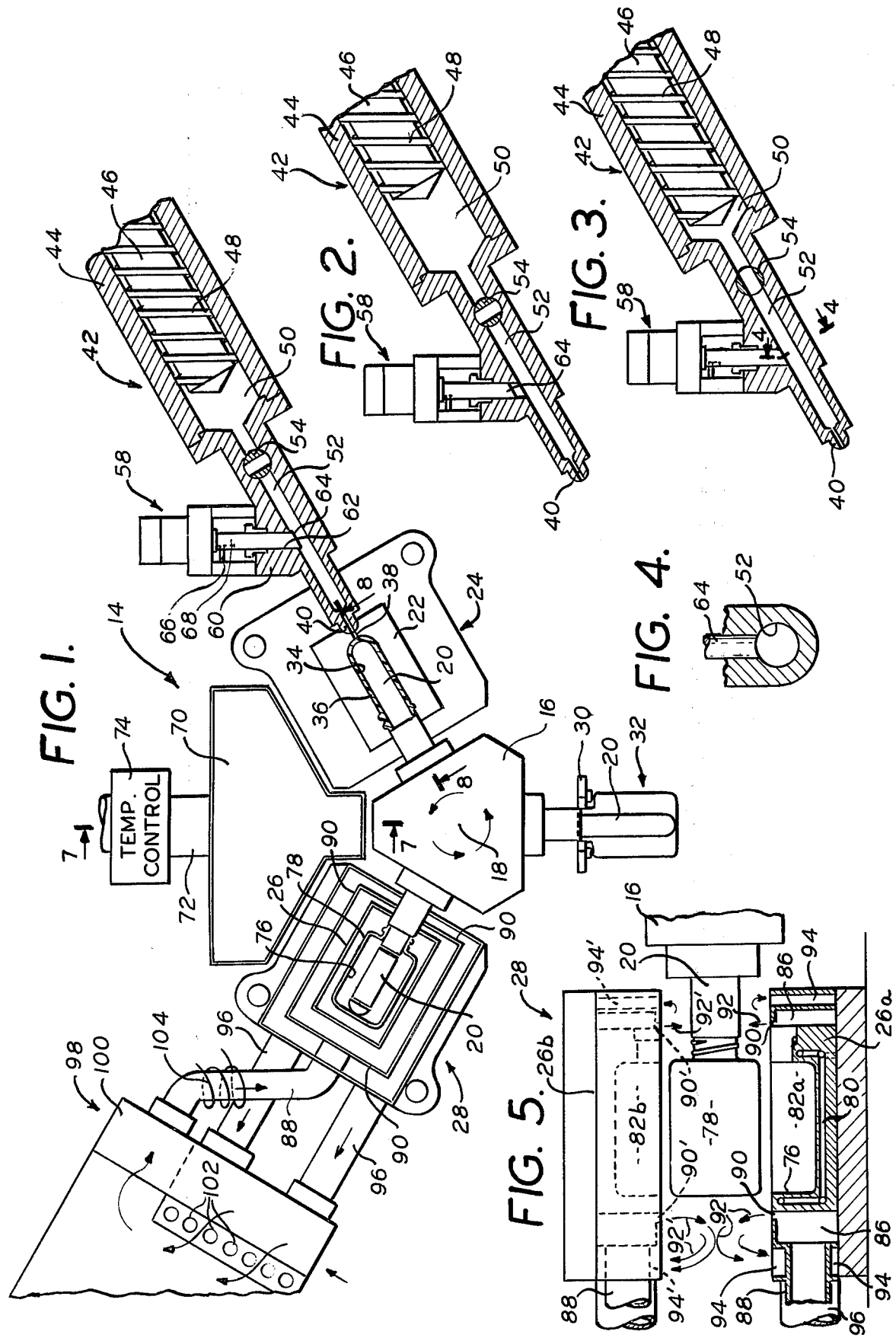

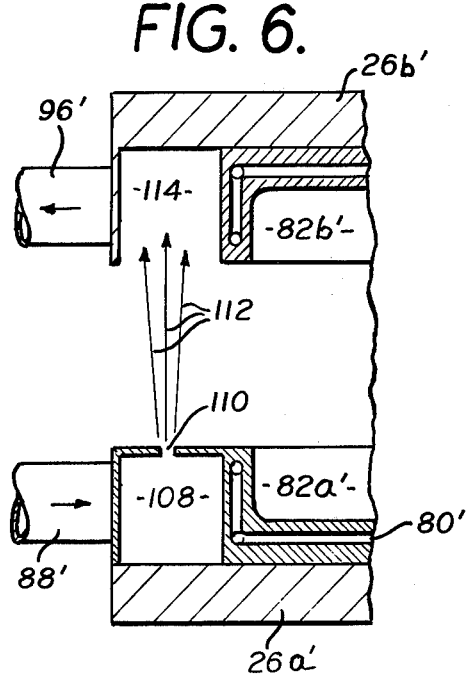
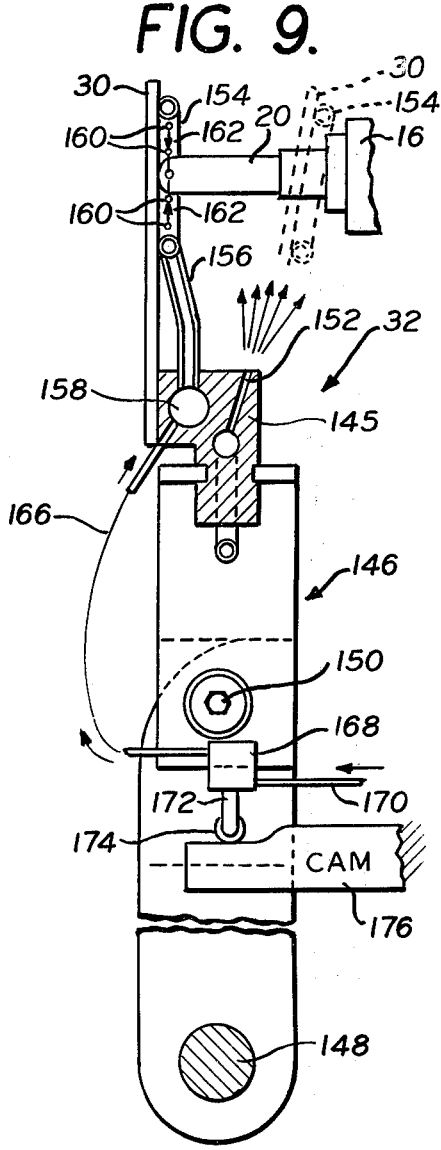
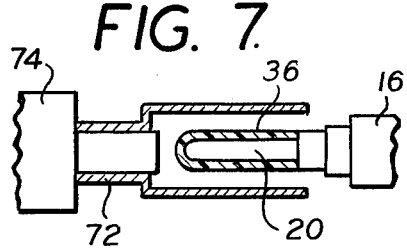
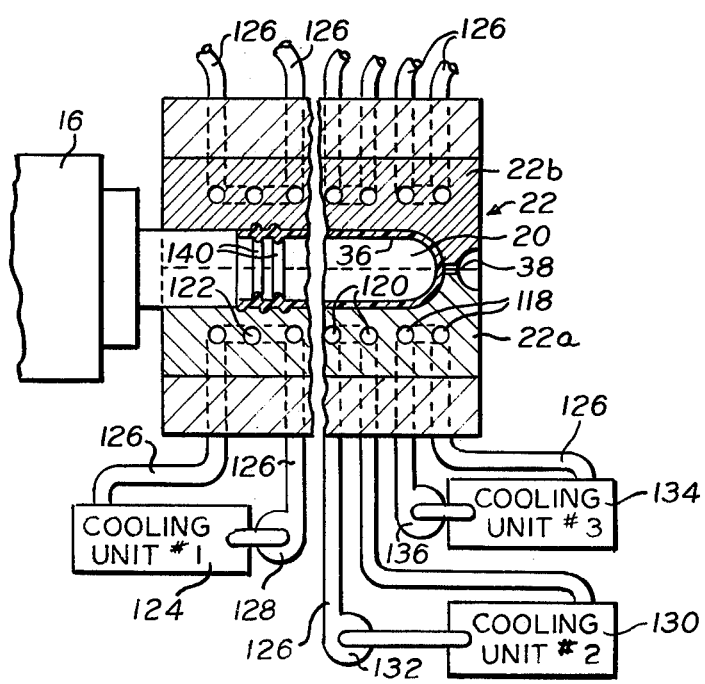
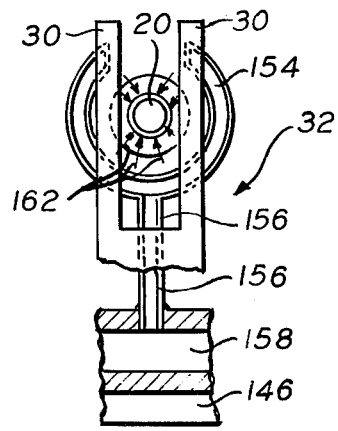

INJECTION MOLDING APPARATUS WITH IMPROVED COOLING

BACKGROUND AND SUMMARY OF THE INVENTION

This invention is concerned with blow molding machines for making plastic articles. It is intended primarily for machines having a table with side faces located at equiangular distances around a center of rotation of the table. For a three station machine, the side faces are at 120° angular relation to one another; and one or more core rods extend from each face.

An injection station is located in position to receive one core rod or group of core rods in an injection mold. Parisons are coated on the core rods in the injection mold by injecting plastic from a plasticizer which supplies the plastic in a molten condition.

A blowing mold is located 120° beyond the injection mold so that while a core rod is receiving a parison in the injection mold, another core rod can be located in a blowing mold at a blow station where the parison is expanded into contact with walls of a mold cavity shaped to the desired shape of the finished product.

At a third station 120° removed from each of the other stations, there is a stripper which ejects blown articles from the core rod so that the core rod is free to return to the injection station to receive another parison.

Such machines can be made with more than three stations so as to include a conditioning station and such other operations as may be desirable, especially the controlling of the temperature of the plastic. The invention will be described as applied to a three-station machine; but application of the invention to other machines will be apparent.

The time that elapses from the closing of the injection mold around a core rod, the injection of the parison, the transfer of the parison to the blowing mold, the blowing and stripping operations and up to the closing of the injection mold again on the same core rod constitutes one cycle of the machine. This invention is concerned with a reduction in the time of the cycle of the machine so that the production of the machine is increased.

In many blown molding machines of the type referred to herein, the length of time that a core rod must remain at the blowing station is usually longer than the time required for injection or the time required for stripping. However, the core rods must remain at the injection and stripping stations just as long as at the blowing stations since all of the core rods are connected with the same head and have to move simultaneously.

This invention reduces the length of time required for the blowing operation by cooling the blown article much more quickly so that it becomes stiff enough to be lifted from the blow mold cavity and transferred to the stripping station in a shorter time than with prior art machines.

The invention reduces the time for the blowing operation to such an extent that the injection operation becomes the longest operation in the cycle of the machine and thus prevents the programming of the machine from taking full advantage of the time saved in the long operation.

In order to take full advantage of the shortened blowing operation, this invention also provides, in combination with the more rapid cooling at the blowing station, a plastic pump unit which cooperates with the plasticizer to reduce the time required for the injection of a parison on a core rod at the injection station.

The speed-up in the injection and molding operation introduces another problem in that the core rods are returned to the injection station so often and in such a short period of time that there is not sufficient time for the core rods to cool but another feature of the invention includes a special auxiliary cooler for the core rods and this combination of features at the injection, blowing and stripping stations reduces the time of the blowing machine cycle by approximately 40–60 percent. It will be evident that this provides a very substantial increase in the production rate of the apparatus.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic top plan view of a blow molding machine equipped with the time saving features of this invention;

FIG. 2 is a view showing the plasticizer and plastic pump means of FIG. 1 with the positions that the parts occupy during the drawback period of the injection molding operation;

FIG. 3 is a view similar to FIG. 2 but showing the positions of the parts during the high pressure injection portion of the injection operation;

FIG. 4 is a greatly enlarged, fragmentary, sectional view taken on the line 4—4 of FIG. 3;

FIG. 5 is an elevation, partly in section, through the blow mold and associated structure at the blowing station of FIG. 1;

FIG. 6 is an enlarged vertical sectional view showing a modified form of the apparatus shown in FIG. 5;

FIG. 7 is an elevation, partly in section, taken on the line 7—7 of FIG. 1;

FIG. 8 is a diagrammatic vertical sectional view, on an enlarged scale, taken on the line 8—8 of FIG. 1;

FIG. 9 is a greatly enlarged side elevation, partly broken away, showing the apparatus at the stripper station of the machine illustrated in FIG. 1; and FIG. 10 is an enlarged front view of the upper part of the structure of FIG. 9, but partly broken away for clearer illustration.

DESCRIPTION OF PREFERRED EMBODIMENT

FIG. 1 shows a plastic molding machine 14 which includes a core rod support or indexing head 16 that rotates intermittently about a center axis 18 in a counterclockwise direction as indicated by the arrows on the table 16. Core rods 20 extend from three faces of the table 16 in angular relation of 120° with respect to one another. There is an injection mold 22 at an injection station 24; a blowing mold 26 at a blowing station 28; and a stripper 30 at a stripper station 32. These stations 24, 28 and 32 are at 120° with respect to one another, about the center axis 18, so that when a core rod is at any one of the stations, the other two core rods are located for operations at the other two stations.

There is an injection cavity 34 in the injection mold 22 and this injection cavity is slightly larger in cross section than the core rod 20 so that there is clearance around the core rod for receiving plastic material that forms a parison 36.

Molten plastic material is injected into the injection mold cavity 34 through a runner 38 at one end of the mold 22. This runner 38 receives molten material from a nozzle 40 of a plasticizer 42.

The plasticizer 42 includes a barrel 44 in which there is a feed screw 46. The feed screw 46 has a helical thread; and in the illustrated construction a double thread 48.

The space within the barrel 44 ahead of the forward end of the screw 46 provides a chamber 50. The size of this chamber depends upon the position of the screw 46. This screw can be reciprocated back and forth like a piston in the barrel 44 and it can be rotated to feed plastic material, which is introduced into the barrel 44 near the rearward end of the screw 46, forward into the chamber 50. During the charging of the chamber 50 by rotating the screw 46, the screw moves rearwardly as the chamber 50 fills with plastic material.

The operation of the plasticizer 42, and thus far described in conventional and no illustration of the apparatus for operating it is necessary for a complete understanding of this invention.

Plastic material in the chamber 50 of the plasticizer is injected into the mold 22 through a passage 52 by which the chamber 50 communicates with the nozzle 40. There is, however, a valve 54 located along the passage 52 and when this valve is in closed position, as shown in FIG. 1, the chamber 50 of the plasticizer barrel is isolated from the rest of the chamber 52 leading to the injection mold 22.

In the operation of a conventional plasticizer, the screw is advanced like a piston to force plastic into the injection mold. The pressure exerted by the screw as a piston is then reduced when the mold is filled, and additional plastic is injected into the mold cavity to compensate for any shrinkage of the plastic as it cools down from the temperature at which it came from the plasticizer. During this low pressure time, the plasticizer screw is rotated to accumulate ahead of the screw sufficient plastic to provide material to fill the cavity or cavities of the injection mold at the next injection operation. This time during which the plastic is being accumulated for the next injection operation is referred to as the "recovery period" of the plasticizer. The plasticizer screw is then moved back enough to suck the plastic material out of the runner or runners of the injection mold and the movement of the plasticizer screw is then stopped and the injection mold can be opened to permit the core rod to move the parison to the blowing station.

In the construction shown in FIG. 1, the valve 54 is used to isolate the plasticizer from the injection mold as soon as the plasticizer has injected material into the injection mold cavities at high pressure. A plastic pump 58 is located along the passage 52 between the valve 54 and the runner 38 of the injection mold. The wall of the passage 52 has a boss 60 which gives the wall of the passage a substantial thickness at the location where the plastic pump 58 is attached to the wall of the passage 52.

An opening 62 is drilled through the boss 60 into the passage 52. This opening 62 serves as a cylinder for a shaft or piston 64 which slides in the cylinder 62 for limited distances. In the construction illustrated, the lower end of the piston 64 is sloped to correspond to the slope of the passage 52 and it is also curved to correspond to the curve of the passage 62 as shown in FIG. 4. In order to maintain this orientation of the piston 64 with respect to the passage 52 there is a fixed stud 66 that projects into a groove 68 in the surface of the piston 64. The stud 66 is secured to a fixed part of the plastic pump 58 and thus prevents rotation of the piston 64 as it moves up and down in the cylinder 62.

Immediately after the injection of molten plastic into the injection mold 22 and the closing of the valve 54, the plastic pump 58 is operated to maintain a downward pressure on its piston 64 and the piston moves downward to the extent necessary to displace plastic material into the mold 22 as necessary to compensate for shrinkage of the plastic in the mold as it cools down from the injection temperature.

The operation of the plastic pump 52 is then reversed so as to move its piston 64 upward, as shown in FIG. 2. This upward movement draws back plastic material from the mold runner 38 to break connection between the parison 36 and the plastic in the runner 38 (FIG. 1).

During these operations of the plastic pump 58, the screw of the plasticizer 44 is rotated to accumulate sufficient plastic in the chamber 50 of the next injection operation. This accumulation of plastic in the chamber 42 is what is known as the "recovery" of the plasticizer which prepares it for the next injection operation.

FIG. 3 shows the end of the next injection operation. The valve 54 opens prior to the start of the injection operation, and the screw 46 moves forward as a piston to force the plastic material at high pressure from the nozzle 40 into the injection mold. During this time the plastic pump 58 also operates to discharge from the cylinder 62 the plastic material which was drawn into the cylinder during the suck back operation. Upon completion of the injection operation by the plasticizer 42, the valve 54 again closes and during the recovery of the plasticizer the plastic pump 58 performs the cooling compensation and suck back operations already described in connection with FIGS. 1 and 2.

When the injection operation including the shrinkage compensation and the suck back operation have been completed, the injection mold 22 opens, the table 16 raises the core rod 20 sufficiently to clear the stationary lower mold sections and the core rods 20 turn as a unit with the table through an angle 120°.

During the travel of the core rod 20 and parison 36 from the injection station 24 to the blowing station 28, they pass through a conditioning chamber 70 which is covered at its top and bottom but open on its sides so that the core rod and parison 36 can pass freely through the chamber 70 with continuous motion. Air or other gas is blown through the chamber 70 from a supply passage 72 which leads from a temperature control device 74 that regulates the temperature of the air supply so as to bring the parison 36 to an orientation temperature by the time it is brought into the blowing mold 26. A section through the conditioning chamber 70 is shown in FIG. 7.

When the core rod 20 and parison 36 reach the blowing mold 26, the table 16 lowers the core rod 20 into the a cavity 76 in the mold 26 and the mold then closes. The parison is blown to make a container 78, or other article; and the blowing operation brings the plastic material into contact with the wall of the cavity 76 which is cooled by the circulation of cooling fluid through chambers 80 in the mold 26, as shown in FIG. 5.

FIG. 5 shows the mold 26 in open position with a stationary lower section 26a and a movable upper section 26b. The lower half of the mold cavity is indicated by the reference character 82a and the upper half of the mold cavity by the reference character 82b. The upper mold section 26b has cooling chambers such as the chamber 80 shown in the sectional view of the lower mold section 26a. The walls of the cavity can be cooled to low temperature quickly by circulating cold water, ethylene glycol, or other cold liquid through the cooling chambers. However, one problem with rapid cooling has been that the cold surfaces of the mold sweat and the presence of drops of water on the wall of the mold cavity has an injurious effect on the outside surface of the blown article or container 78. The appearance of the surface is badly marred and the container produced is commercially unacceptable.

FIG. 5 shows a construction for preventing sweating of the mold surfaces and particularly the wall of the mold cavity. A plenum 86 completely surrounds the side walls of the lower mold section 26a. This plenum is supplied with dry air at relatively low temperature through a supply duct 88. Except for the supply duct 88, the plenum 86 is closed except for a slot 90 which extends around the entire periphery at the upper edge of the side of the mold 26a. The air is discharged upwardly through the slot 90 in the directions indicated by the arrows 92 and it forms an air curtain of substantial velocity. A similar construction of the upper mold section 26b has slots 90' which open downwardly and discharge a high velocity air curtain in the direction indicated by the arrows 92'.

These air curtains 92 and 92' meet one another and are turned back as indicated by the arrows 92 and 92'. Surrounding the outside wall of the plenum 86, there is another plenum 94 which is open at the top and from which air is withdrawn through exhaust conduits 96. Thus the air curtains 92 and 92' when turned back by contact with one another, are sucked into the plenum 94 and a corresponding plenum 94' that surrounds the plenum 90' of the upper mold section 26b.

The exhaust ducts 96 lead to an air conditioning unit 98 (FIG. 1). The air conditioning unit removes moisture from the air and then circulates the air by means of a blower 100 back to the plenums 86 through the inlet ducts 88.

The air conditioning unit 98 preferably removes moisture from the air by passing the air across cooling coils 102 and the air is cooled to a temperature substantially lower than that at which it is to be discharged from the plenums to form the air curtain. After condensing moisture from the air, the air is heated to reduce its relative humidity before being discharged for the air curtains. This heating can be done in various ways and there is a coil 104 shown in FIG. 1 which is representative of means for heating the air as it passes through the duct 88.

If the air supplied for the air curtain is considerably cooler than the blow mold, then it is not necessary to have the heating coil 104 to lower the relative humidity of the air because the air will be heated by the mold and this will lower the relative humidity of the air so that there is no risk of sweating. If the mold is at a lower temperature than the air so that it will reduce the air temperature then the relative humidity with which the air is supplied to the curtains around the mold must be such that the dew point of the air curtains is lower than the temperature to which the air will be cooled by the mold. The purpose of the air curtains is to prevent any other air from the ambient atmosphere from entering between the mold sections 26a and 26b as they move apart to open the mold and to prevent any of the ambient atmosphere from contacting with the cold walls of the mold cavity when the blown article or container 78 is out of contact with the walls of the cavity, as is the case in FIG. 5.

FIG. 6 shows a modification of the construction shown in FIG. 5. Instead of producing a curtain of air by blowing streams from both the upper and lower sections of the blow mold, FIG. 7 has a plenum 108 with a slot 110 from which a curtain of air is discharged at high velocity as indicated by the arrows 112. This curtain of air is discharged into a plenum 114 which has an open bottom and which surrounds the upper mold section 26b'. The air discharged into the plenum 114 is sucked out of the plenum by the air conditioning unit through a duct 96'. Other parts corresponding to FIGS. 1 and 5 are indicated in FIG. 6 by the same reference characters with a prime appended.

The time saved in the blowing operation by reducing the blow mold temperature so much less as the result of the air curtains provided by this invention around the blow mold, makes the blowing operation shorter in time than the injection operation. It is necessary, therefore, that this invention reduce the time that a core rod must remain at the injection station.

There is considerable reduction in time at the injection station, as a result of the use of the plastic pump 58 which has already been described. Another problem arises, however, when the parison is removed from the injection cavity without sufficient cooling of the plastic. As a high temperature parison cools after leaving the injection mold, the plastic shrinks and the neck end of the parison pulls away from the shoulder of the core rod. This causes the neck portion, which generally has threads on it, to no longer occupy the position that it should in order to fit the neck portion of the blowing mold.

FIG. 8 shows a construction for the blow mold 22 which prevents shrinkage of the parison after it leaves the injection mold. Lower and upper sections 22a and 22b, respectively, of the injection mold have cooling chambers 118, 120 and 122. Since part of the mold 22 is broken away in FIG. 8, there may be other cooling chambers for the broken away portion.

A cooling unit No. 1, designated by the reference character 124, has passages 126 leading to the cooling chamber 122 and cooling fluid from the unit 124 is circulated through the cooling chamber 122 by a pump 128.

Cooling fluid to the cooling chamber 120 is supplied from a cooling unit 130 and circulated by a pump 132. In like manner cooling fluid for the cooling chamber 118 is supplied by a cooling unit 134 having a pump 136.

The cooling units 124, 130 and 134 may supply different amounts of cooling so that the cooling is progressively greater toward the neck end of the parison 36; or the cooling for most of the length of the parison may be substantially the same; but the feature of FIG. 8 is that the neck portion of the parison is cooled to a much lower temperature and is at least partially solidified before it is removed from the injection mold. There are circumferential grooves 140 in the neck portion of the core rod 20. These grooves 140 are filled with plastic when the parison is applied to the core rod and when the neck portion of the parison solidifies, the beads formed by the plastic in the grooves 140 locks the neck portion of the parison against any axial movement with respect to the core rod.

The balance of the parison 36, beyond the neck portion, must be maintained at a temperature high enough for blowing. Any shrinkage that occurs in the parison 36 after leaving the injection mold 22 will cause a stretching of the parison between the neck portion, which cannot move becuase of the beads in the circumferential grooves 140, and the other end of the parison which cannot move because it is in contact with the end of the core rod. This thins the wall of the parison to some extent; and if it is enough to effect the wall of the finished article adversely, compensation can be made by shaping the injection mold cavity to provide some extra thickness of the original parison plastic to compensate for the shrinkage.

The upper mold section 22b is cooled in the same way as the lower mold section 22a and passages 126 for the upper mold section cooling chambers can be supplied with cooling fluid from the same cooling units as are used for the lower mold section 22a.

The depth of the grooves 140 must be limited and the sides of the grooves should slope so that after the parison is blown into a container, the container can be stripped from the core rod 20. This stripping requires that the neck portion of the container expand slightly so that the beads in the grooves 140 can expand enough to slip out of the grooves.

FIG. 9 is a diagrammatic view of the stripper station 32. The actual stripper consists of the arms 30 which extend on either side of the core rod 20 for pushing a container off the core rod at the stripper station. The stripper arms 30 are secured to a block 145 attached to the upper end of an arm 146 which moves angularly about a cylindrical support 148. The arm 146 is jointed at a pivot 150 which has a bolt for clamping the upper and lower sections of the arm 146 in a fixed relation to one another; and which can be loosened to adjust the direction of extent of the arm 146 to accommodate the stripper to core rods and blow articles of different length. This construction is not a part of the present invention.

The block 145 has a discharge outlet 152 from which air is blown upward to cool the core rod 20. This is a conventional construction. The novelty of the apparatus shown in FIGS. 9 and 10 consist in a ring 156 which is provided with a stem 158 that extends down to the block 145 and that communicates with a chamber 158 inside the block.

The ring 154 is concentric with the core rod 20 and moves as a unit with the stripper arms 30 since both the stripper 30 and the stem 156 are rigidly secured to the block 145.

Cooling air is supplied to the ring 154 and it discharges from orifices 160 angularly spaced around the inside surface of the ring 154. Air jets indicated by the arrows 162, in FIGS. 9 and 10 are discharged from the orifices 160 into contact with the core rod 20 to provide extra cooling for the core rod 20. When necessary to provide adequate cooling, the air supplied to the orifices 160 may be refrigerated air.

Air supply for the ring 154 shows up through the stem 156 from the chamber 158. The chamber 158 is connected by a hose 166 which leads to a valve housing 168. A valve in the housing 168 controls the flow of air from a passage 170.

The ultimate supply of air to the passage 170 and to the orifice 152 is controlled ultimately by the programming apparatus of the machine. However, the valve in the housing 168 is controlled by a valve stem 172 operated by a cam follower 174 which moves along the top surface of a cam 176.

The cam 176 is connected with a stationary part of the molding machine so that as the arm 146, which carries the valve housing 168, swings angularly about its cylindrical bearing 168, the follower 174 moves along the top surface of the cam 176. The cam 176 is shaped so that as the ring 154 approaches the portions of the core rod 20, which are thicker than the other portions, more air is supplied to the orifices 160. Thus there is an increase in the flow of air and a consequent increase in the rate of cooling, as the ring 154 approaches the portions of the core rod which have more metal in their cross section and which therefore require more cooling to bring down the temperature of the metal.

The preferred embodiment of the invention has been illustrated and described, but changes and modifications can be made, and some features can be used in different combinations without departing from the invention as defined in the claims.

I claim:

1. A blow molding machine for making plastic articles including an injection station, a blowing station, and a stripper station; a core rod support that moves horizontally disposed core rods horizontally, successively from one station to the next through a cycle, a blow mold at the blowing station including a cavity into which successive core rods extend for blowing parisons on the core rods while in said cavity, a cooling chamber in the blow mold and through which cooling fluid circulates, an air conditioner that removes moisture from air to lower the dew point of the air, and means for supplying the dried air in a continuous curtain transversely disposed to the horizontally disposed core rods so as to prevent other air from contacting and depositing moisture on the mold, characterized by the blow mold having two sections that move toward and from each other to open and close the mold, and air discharge means located adjacent to one end of the space that is formed between the mold sections as they move away from one another, the dried air being supplied to said air discharge means and flowing therefrom as a curtain of air around said space and wherein said curtain is spaced from said blow article, characterized by the air discharge means comprising a jacket around the sides of one of the mold sections and forming with said sides a plenum having a slot at the end thereof which is closest to the other mold section and from which air is discharged around the entire periphery of the space between the mold sections when the mold sections are separated from one another.

2. The blow molding machine described in claim 1 characterized by another plenum at the other end of the air curtain and into which the air curtain flows, and a duct system through which air in said other plenum is recirculated back to the air conditioner.

3. A blow molding machine for making plastic articles including an injection station, a blowing station, and a stripper station; a core rod support that moves core rods successively from one station to the next through a cycle, a blow mold at the blowing station including a cavity into which successive core rods extend for blowing parisons on the core rods while in said cavity, a cooling chamber in the blow mold and through which cooling fluid circulates, an air conditioner that removes moisture from air to lower the dew point of the air, and means for supplying the dried air to exposed surfaces of the blow mold at the time of discharge of a blown article therefrom to prevent sweating of said surfaces, characterized by a mold at the injection station and in which a parison is applied to a core rod, a plasticizer that injects molten material into the injection mold, valve means for shutting off the plasticizer from the mold to shorten the cycle of the plasticizer by permitting the plasticizer to recover sooner after each injection in preparation for the next injection, and an auxiliary plastic pump that performs some of the operations of the injection cycle in place of the plasticizer, characterized by auxiliary cooling means for the core rods to compensate for the shorter cycle of the molding machine resulting from the shorter blowing operation and the shorter injection cycle, said auxiliary cooling means including a fluid supply head in position to discharge cooling fluid from said head into contact with an outside surface of the core rod after stripping of the blown article from the core rod, characterized by a stripper at the stripper station movable into contact with a blown article and lengthwise of the core rod to strip the blown article from the core rod, and auxiliary cooling means for the core rod including a head with jet orifices that blow fluid streams against the outside of the core rod around the circumference of the core rod, bearing means on which the head is movable lengthwise of the core rod to blow the cooling fluid against the different parts of the length of the core rod, and valve means that change the rate at which the fluid is blown against the core rod in accordance with the position of the head along the length of the core rod and in accordance with different cross sections of materials of the core rod at different regions along the length thereof.

4. The blow molding machine described in claim 3 characterized by a cam and cam follower, one of which has relative movement with respect to the other proportional to the movement of the head along the length of the core rod, the cam being contoured to change the rate of flow of cooling fluid from the jets in proportion to the amount of heat to be removed from the various portions of the core rod along its length.

5. A blow molding machine for making plastic articles including an injection station, a blowing station, and a stripper station; a core rod support that moves core rods successively from one station to the next through a cycle, a blow mold at the blowing station including a cavity into which successive core rods extend for blowing parisons on the core rods while in said cavity, a cooling chamber in the blow mold and through which cooling fluid circulates, an air conditioner that removes moisture from air to lower the dew point of the air, and means for supplying the dried air to exposed surfaces of the blow mold at the time of discharge of a blown article therefrom to prevent sweating of said surfaces characterized by an injection mold at the injection station, and an enclosure between the injection station and the blowing station through which each core rod passes on its way from the injection mold to the blow mold, said enclosure being open at both ends for passage of the core rods through the enclosure with continuous motion, means for blowing dry air over a parison on the core rod while passing through the enclosure, and means for controlling the temperature of the air supplied to said enclosure.

6. A blow molding machine for making plastic articles including an injection station, a blowing station, and a stripper station; a core support that moves core rods successively from one station to the next through a cycle, auxiliary cooling means for the core rods including a fluid supply head in position to discharge cooling fluid from said head into contact with an outside surface of the core rod after the stripping of a blown article from the core rod, a stripper at the stripper station movable into contact with a blown article and lengthwise of the core rod to strip the blown article from the core rod, the auxiliary cooling means for the core rod including a head with a jet orifice that blows fluid streams against the outside of the core rod around the circumference of the core rod, bearing means on which the head is movable lengthwise of the core rod to blow the cooling fluid along different portions of the length of the core rod, and valve means that change the rate at which fluid is blown against the core rod in accordance with the position of the head along the length of the core rod.

* * * * *